UNITED STATES PATENT OFFICE.

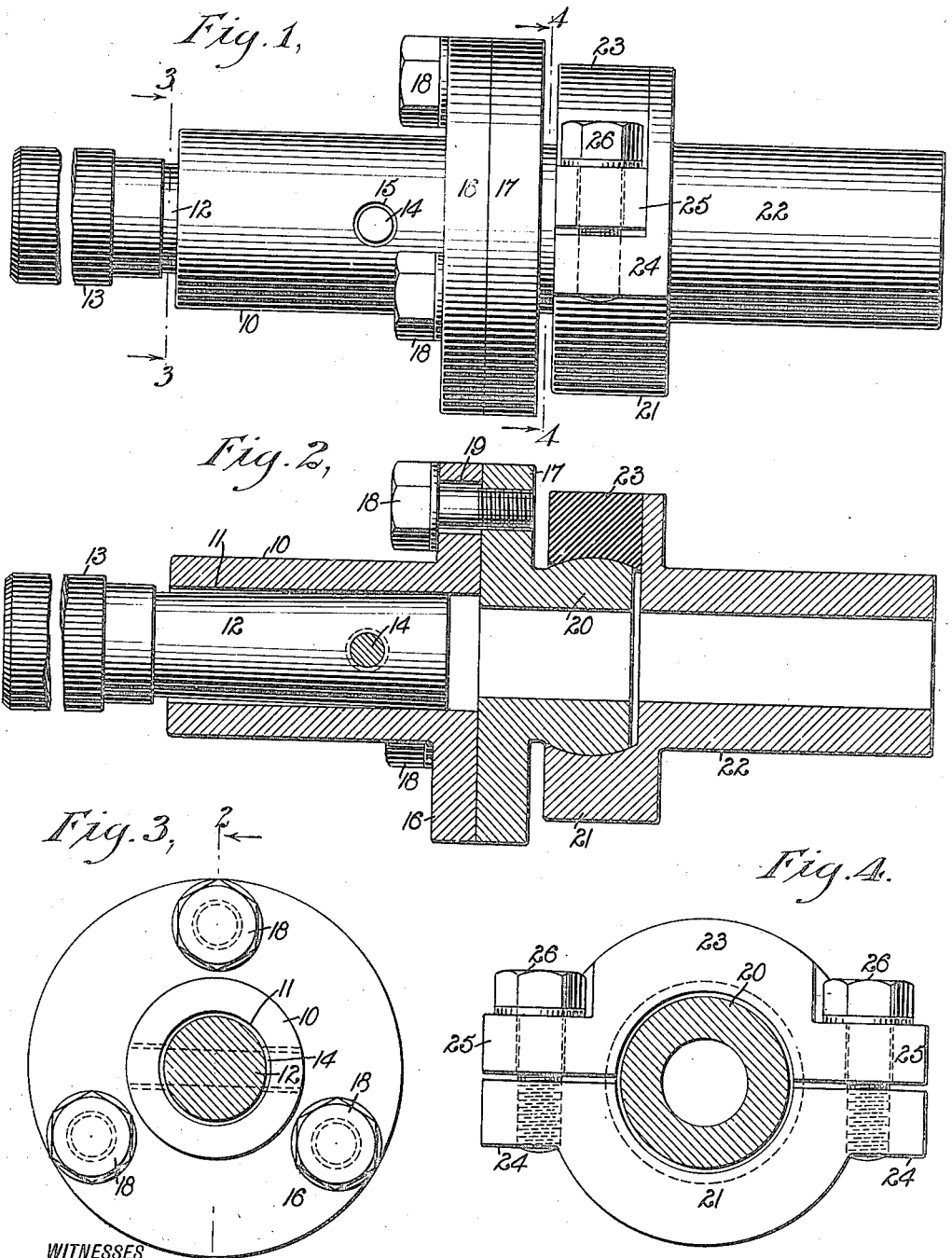

ROBERT RAILTON, OF VALLEY FALLS, RHODE ISLAND.

ADJUSTABLE FLOATING-REAMER HOLDER.

1,222,466.   Specification of Letters Patent.   Patented Apr. 10, 1917.

Application filed October 18, 1916. Serial No. 126,251.

*To all whom it may concern:*

Be it known that I, ROBERT RAILTON, a citizen of the United States, and a resident of Valley Falls, in the county of Providence and State of Rhode Island, have invented a new and Improved Adjustable Floating-Reamer Holder, of which the following is a full, clear, and exact description.

My invention relates to floating reamers and has for its purpose to provide adjustments of the reamer holder which together with the floating of the reamer will enable accurate reaming to be attained.

The nature of the invention will clearly appear as the description proceeds.

Reference is to be had to the accompanying drawings forming a part of this specification in which similar reference characters indicate corresponding parts in all the views.

Figure 1 is a side elevation of a reamer holder embodying my invention;

Fig. 2 is a longitudinal vertical section on the line 2—2, Fig. 1;

Fig. 3 is a cross section on the line 3—3, Fig. 1;

Fig. 4 is a cross section on the line 4—4, Fig. 1.

In carrying out my invention in accordance with the illustrated example, a reamer support 10 is provided with a bore 11 to receive the shank 12 of a reamer 13. A transverse pin 14 is passed through the shank 12 and through pin holes 15 in the sides of the holder 10.

The relation between the bore 11 and the shank 12 is such that the shank will fit snugly in the bore at the rear end but will have clearance for a limited floating action forward of the rear end. In the illustrated example this is effected by tapering the shank 12.

The support 10 is formed with a flange 16 which is secured to a ball flange 17 in a manner to permit of said support being variously adjusted on the face of the flange 17 in a plane parallel with said face. For the purpose machine screws 18 are employed preferably three in number which pass through holes 19 in the flange 16 and take into the flange 17, said holes 19 being sufficiently larger than the screws 18 to permit of the flange 16 being adjusted in various directions over the face of the flange 17.

The ball 20 of the ball flange 17 is received in a socket 21 having a shank 22 for securing the device in a turret. To clamp the ball 20 in adjusted position, the socket includes a clamp 23, and the socket 21 and clamp 23 are formed with lateral flanges 24, 25 to receive fastening screws 26.

To set the holder in line with the hole to be reamed, the piece of work is placed in the chuck, a hole is then bored, say one-inch in diameter true with the axis of the spindle, a plug one inch in diameter is then inserted in the hole and having sufficient length to project beyond the piece of work sufficiently to enter the bore 11 of the reamer support. The holder is now fixed in the turret, all screws in the holder being loosened, and the turret is brought up to the plug so that the reamer support will slip on the plug. The screws 18 are now partially tightened, after which the screws 26 are fully tightened to rigidly bind the ball 20. The holder is now perfectly in line with the hole to be reamed and the reamer is placed in the holder, the pin 14 is passed through the holder and the shank 12 of the reamer, and the plug removed from the piece of work.

The new construction effectively provides against the dropping of the spindle out of line with the turret. It also provides against the wear of the turret slide sidewise and at the bottom. The holes in the turret tend to become tapered, that is, larger at the front end thereof, through wear; this device through the ball and socket arrangement overcomes this tendency.

Having thus described my invention, I claim as new, and desire to secure by Letters Patent:

1. A reamer and reamer holder including a reamer support having a bore for the reamer shank, a reamer having a shank fitting said bore snugly at the rear end and having clearance forward of said rear end for floating movement in the holder, a ball flange on the face of which the said support is variously adjustable in a plane parallel with said face, a socket element receiving said ball and having means to secure the same in a turret, said socket including a ball clamp adapted to rigidly clamp the ball of said ball flange in adjusted position.

2. A reamer and reamer holder including a reamer support having a bore to receive a reamer shank, a reamer having a shank fitting said bore snugly at the rear end and having clearance forward of said rear end for floating movement in the holder, a transverse pin extending through the said holder and reamer shank, a ball flange on the face of which the said support is variously adjustable in a plane parallel with said face, a socket element receiving said ball and having means to secure the same in a turret, said socket including a ball clamp adapted to rigidly clamp the ball of said ball flange in adjusted position.

3. A reamer holder including a reamer support having a bore adapted to receive the shank of a reamer, a ball flange on the face of which the support is variously adjustable in a plane parallel with the said face, and a socket element receiving said ball and having means to secure the same in a turret, said socket including a ball clamp adapted to rigidly clamp the ball of said ball flange in adjusted position.

4. A reamer holder including a reamer support having a bore adapted to receive the shank of a reamer, a transverse pin in said holder adapted to secure the reamer shank thereto, a ball flange on the face of which the support is variously adjustable in a plane parallel with said face, and a socket element receiving said ball and having means to secure the same in a turret, said socket including a ball clamp adapted to rigidly clamp the ball of said ball flange in adjusted position.

5. A reamer holder including a reamer support having a bore to receive a reamer, a flange, means to fasten the support to said flange for variously adjusting the same in a plane parallel with said face, means to secure the holder in a turret, elements forming a universal connection between said flange and said last-mentioned means, and means to prevent movement of the said universal elements to hold the same in a given adjustment.

ROBERT RAILTON.